United States Patent [19]
Tsui

[11] Patent Number: 5,115,156
[45] Date of Patent: May 19, 1992

[54] APPARATUS FOR TRIGGERING A PLURALITY OF THYRISTOR DEVICES

[76] Inventor: Huai-Chou Tsui, 4F, No. 8-3, Sheng-Li Rd., Tainan City, Taiwan

[21] Appl. No.: 591,287

[22] Filed: Oct. 1, 1990

[51] Int. Cl.$^5$ .................. H03K 17/296; H03K 17/72; H03K 17/94
[52] U.S. Cl. .................................. 307/638; 307/640; 323/241; 323/268
[58] Field of Search ............... 307/638, 640, 645, 648; 323/241, 268, 269

[56] References Cited

U.S. PATENT DOCUMENTS

3,305,844 2/1967 Yadav et al. .................. 307/648
4,347,562 8/1982 Galloway ...................... 323/241

Primary Examiner—John Zazworsky
Attorney, Agent, or Firm—Brumbaugh, Graves, Donohue & Raymond

[57] ABSTRACT

An apparatus for triggering a plurality of thyristor devices includes a full-wave rectifier circuit having a sinusoidal pulse output, a Schmitt trigger circuit to generate a constant amplitude pulse signal when the sinusoidal pulse output exceeds a certain triggering level, a clock pulse generator to generate a predetermined number of clock pulses within the duration of the constant amplitude pulse signal, and an address counter to receive the generated clock pulses. The address counter has a digital output corresponding to the number of clock pulses received. A read-only memory unit has digital data stored therein. The memory unit has a plurality of address lines to receive the digital output of the address counter and a set of output data bits corresponding to the stored digital data which is accessed according to the digital output of the address counter. Each thyristor device is triggered into the conducting state by one of the output data bits of the memory unit.

3 Claims, 8 Drawing Sheets

| TRIG POINT | ROM ADDRESS ||||||  8 BITS DATA OUT ||||||||
|---|---|---|---|---|---|---|---|---|---|---|---|---|---|---|
|  | A11 | A10 | A3 | A2 | A1 | A0 | D7 | D6 | D5 | D4 | D3 | D2 | D1 | D0 |
| d1 | 0 | 0 | 0 | 0 | 0 | 0 | 1 | 0 | 0 | 0 | 0 | 0 | 0 | 0 |
| d2 | 0 | 1 | 0 | 0 | 0 | 0 | 0 | 0 | 0 | 0 | 0 | 0 | 0 | 0 |
| d3 | 1 | 0 | 0 | 0 | 0 | 0 | 0 | 0 | 0 | 0 | 0 | 0 | 0 | 0 |
| d4 | 1 | 1 | 0 | 0 | 0 | 0 | 0 | 0 | 0 | 0 | 0 | 0 | 0 | 0 |
| d5 | 0 | 0 | 0 | 0 | 0 | 1 | 0 | 0 | 0 | 0 | 0 | 0 | 0 | 0 |
| d6 | 0 | 1 | 0 | 0 | 0 | 1 | 0 | 0 | 0 | 0 | 0 | 0 | 0 | 0 |
| d7 | 1 | 0 | 0 | 0 | 0 | 1 | 0 | 0 | 0 | 0 | 1 | 0 | 0 | 0 |
| d8 | 1 | 1 | 0 | 0 | 0 | 1 | 0 | 0 | 0 | 0 | 0 | 0 | 0 | 0 |
| d9 | 0 | 0 | 0 | 0 | 1 | 0 | 0 | 0 | 0 | 0 | 0 | 0 | 0 | 0 |
| d10 | 0 | 1 | 0 | 0 | 1 | 0 | 0 | 0 | 0 | 0 | 0 | 0 | 0 | 0 |
| d11 | 1 | 0 | 0 | 0 | 1 | 0 | 0 | 0 | 0 | 0 | 0 | 0 | 0 | 0 |
| d12 | 1 | 1 | 0 | 0 | 1 | 0 | 0 | 0 | 0 | 0 | 0 | 0 | 0 | 0 |
| d13 | 0 | 0 | 0 | 0 | 1 | 1 | 0 | 0 | 0 | 0 | 0 | 0 | 0 | 0 |
| d14 | 0 | 1 | 0 | 0 | 1 | 1 | 0 | 0 | 0 | 0 | 0 | 0 | 0 | 0 |
| d15 | 1 | 0 | 0 | 0 | 1 | 1 | 0 | 0 | 0 | 0 | 0 | 0 | 0 | 0 |
| d16 | 1 | 1 | 0 | 0 | 1 | 1 | 0 | 0 | 0 | 0 | 0 | 0 | 0 | 0 |
| d17 | 0 | 0 | 0 | 1 | 0 | 0 | 0 | 0 | 0 | 0 | 0 | 0 | 0 | 0 |
| d18 | 0 | 1 | 0 | 1 | 0 | 0 | 0 | 0 | 0 | 0 | 0 | 0 | 0 | 0 |
| d19 | 1 | 0 | 0 | 1 | 0 | 0 | 0 | 0 | 0 | 0 | 0 | 0 | 0 | 0 |
| d20 | 1 | 1 | 0 | 1 | 0 | 0 | 0 | 0 | 0 | 0 | 0 | 0 | 0 | 0 |
| d21 | 0 | 0 | 0 | 1 | 0 | 1 | 0 | 0 | 0 | 0 | 0 | 0 | 0 | 0 |
| d22 | 0 | 1 | 0 | 1 | 0 | 1 | 0 | 0 | 0 | 0 | 0 | 0 | 0 | 0 |
| d23 | 1 | 0 | 0 | 1 | 0 | 1 | 0 | 0 | 0 | 0 | 0 | 0 | 0 | 0 |
| d24 | 1 | 1 | 0 | 1 | 0 | 1 | 0 | 0 | 0 | 0 | 0 | 0 | 0 | 0 |
| d25 | 0 | 0 | 0 | 1 | 1 | 0 | 0 | 0 | 0 | 0 | 0 | 0 | 0 | 0 |
| d26 | 0 | 1 | 0 | 1 | 1 | 0 | 0 | 0 | 0 | 0 | 0 | 0 | 0 | 0 |
| d27 | 1 | 0 | 0 | 1 | 1 | 0 | 0 | 0 | 0 | 0 | 0 | 0 | 0 | 0 |
| d28 | 1 | 1 | 0 | 1 | 1 | 0 | 0 | 0 | 0 | 0 | 0 | 0 | 0 | 0 |
| d29 | 0 | 0 | 0 | 1 | 1 | 1 | 0 | 0 | 0 | 0 | 0 | 0 | 0 | 0 |
| d30 | 0 | 1 | 0 | 1 | 1 | 1 | 0 | 0 | 0 | 0 | 0 | 0 | 0 | 0 |
| d31 | 1 | 0 | 0 | 1 | 1 | 1 | 0 | 0 | 0 | 0 | 0 | 0 | 0 | 0 |
| d32 | 1 | 1 | 0 | 1 | 1 | 1 | 0 | 0 | 0 | 0 | 0 | 0 | 0 | 0 |

FIG. 5A

| TRIG POINT | ROM ADDRESS ||||||  8 BITS DATA OUT ||||||||
|---|---|---|---|---|---|---|---|---|---|---|---|---|---|---|
| | A11 | A10 | A3 | A2 | A1 | A0 | D7 | D6 | D5 | D4 | D3 | D2 | D1 | D0 |
| d33 | 0 | 0 | 1 | 0 | 0 | 0 | 0 | 0 | 0 | 0 | 0 | 0 | 0 | 0 |
| d34 | 0 | 1 | 1 | 0 | 0 | 0 | 0 | 0 | 0 | 0 | 0 | 0 | 0 | 1 |
| d35 | 1 | 0 | 1 | 0 | 0 | 0 | 0 | 0 | 0 | 0 | 0 | 0 | 0 | 0 |
| d36 | 1 | 1 | 1 | 0 | 0 | 0 | 0 | 0 | 0 | 0 | 0 | 0 | 0 | 0 |
| d37 | 0 | 0 | 1 | 0 | 0 | 1 | 0 | 0 | 0 | 0 | 0 | 0 | 0 | 0 |
| d38 | 0 | 1 | 1 | 0 | 0 | 1 | 0 | 0 | 0 | 0 | 0 | 0 | 0 | 0 |
| d39 | 1 | 0 | 1 | 0 | 0 | 1 | 0 | 0 | 0 | 0 | 0 | 0 | 0 | 0 |
| d40 | 1 | 1 | 1 | 0 | 0 | 1 | 0 | 0 | 0 | 0 | 0 | 0 | 0 | 0 |
| d41 | 0 | 0 | 1 | 0 | 1 | 0 | 0 | 0 | 0 | 0 | 0 | 0 | 0 | 0 |
| d42 | 0 | 1 | 1 | 0 | 1 | 0 | 0 | 0 | 0 | 0 | 0 | 0 | 0 | 0 |
| d43 | 1 | 0 | 1 | 0 | 1 | 0 | 0 | 0 | 0 | 0 | 0 | 0 | 0 | 0 |
| d44 | 1 | 1 | 1 | 0 | 1 | 0 | 0 | 0 | 0 | 0 | 0 | 0 | 0 | 0 |
| d45 | 0 | 0 | 1 | 0 | 1 | 1 | 0 | 0 | 0 | 0 | 0 | 0 | 0 | 0 |
| d46 | 0 | 1 | 1 | 0 | 1 | 1 | 0 | 0 | 0 | 0 | 0 | 0 | 0 | 0 |
| d47 | 1 | 0 | 1 | 0 | 1 | 1 | 0 | 0 | 0 | 0 | 0 | 0 | 0 | 0 |
| d48 | 1 | 1 | 1 | 0 | 1 | 1 | 0 | 0 | 0 | 0 | 0 | 0 | 1 | 0 |
| d49 | 0 | 0 | 1 | 1 | 0 | 0 | 0 | 0 | 0 | 0 | 0 | 0 | 0 | 0 |
| d50 | 0 | 1 | 1 | 1 | 0 | 0 | 0 | 0 | 0 | 0 | 0 | 0 | 0 | 0 |
| d51 | 1 | 0 | 1 | 1 | 0 | 0 | 0 | 0 | 0 | 0 | 0 | 0 | 0 | 0 |
| d52 | 1 | 1 | 1 | 1 | 0 | 0 | 0 | 0 | 0 | 0 | 0 | 0 | 0 | 0 |
| d53 | 0 | 0 | 1 | 1 | 0 | 1 | 0 | 0 | 0 | 0 | 0 | 0 | 0 | 0 |
| d54 | 0 | 1 | 1 | 1 | 0 | 1 | 0 | 0 | 0 | 0 | 0 | 0 | 0 | 0 |
| d55 | 1 | 0 | 1 | 1 | 0 | 1 | 0 | 0 | 0 | 0 | 0 | 0 | 0 | 0 |
| d56 | 1 | 1 | 1 | 1 | 0 | 1 | 0 | 0 | 0 | 0 | 0 | 0 | 0 | 0 |
| d57 | 0 | 0 | 1 | 1 | 1 | 0 | 0 | 0 | 0 | 0 | 0 | 0 | 0 | 0 |
| d58 | 0 | 1 | 1 | 1 | 1 | 0 | 0 | 0 | 0 | 0 | 0 | 0 | 0 | 0 |
| d59 | 1 | 0 | 1 | 1 | 1 | 0 | 0 | 0 | 0 | 0 | 0 | 0 | 0 | 0 |
| d60 | 1 | 1 | 1 | 1 | 1 | 0 | 0 | 0 | 0 | 0 | 0 | 0 | 0 | 0 |
| d61 | 0 | 0 | 1 | 1 | 1 | 1 | 0 | 0 | 0 | 0 | 0 | 0 | 0 | 0 |
| d62 | 0 | 1 | 1 | 1 | 1 | 1 | 0 | 0 | 0 | 0 | 0 | 0 | 0 | 0 |
| d63 | 1 | 0 | 1 | 1 | 1 | 1 | 0 | 0 | 0 | 0 | 0 | 0 | 0 | 0 |
| d64 | 1 | 1 | 1 | 1 | 1 | 1 | 0 | 0 | 0 | 0 | 0 | 0 | 0 | 0 |

FIG. 5B

| TRIG POINT | ROM ADDRESS | | | | | | 8 BITS DATA OUT | | | | | | | |
|---|---|---|---|---|---|---|---|---|---|---|---|---|---|---|
| | A11 | A10 | A3 | A2 | A1 | A0 | D7 | D6 | D5 | D4 | D3 | D2 | D1 | D0 |
| d1  | 0 | 0 | 0 | 0 | 0 | 0 | 1 | 0 | 0 | 0 | 0 | 0 | 0 | 0 |
| d2  | 0 | 1 | 0 | 0 | 0 | 0 | | | | | | | | |
| d3  | 1 | 0 | 0 | 0 | 0 | 0 | | | | | | | | |
| d4  | 1 | 1 | 0 | 0 | 0 | 0 | | | | | | | | |
| d5  | 0 | 0 | 0 | 0 | 0 | 1 | 1 | 0 | 0 | 0 | 0 | 0 | 0 | 0 |
| d6  | 0 | 1 | 0 | 0 | 0 | 1 | | | | | | | | |
| d7  | 1 | 0 | 0 | 0 | 0 | 1 | | | | | | | | |
| d8  | 1 | 1 | 0 | 0 | 0 | 1 | | | | | | | | |
| d9  | 0 | 0 | 0 | 0 | 1 | 0 | 1 | 1 | 0 | 0 | 0 | 0 | 0 | 0 |
| d10 | 0 | 1 | 0 | 0 | 1 | 0 | | | | | | | | |
| d11 | 1 | 0 | 0 | 0 | 1 | 0 | | | | | | | | |
| d12 | 1 | 1 | 0 | 0 | 1 | 0 | | | | | | | | |
| d13 | 0 | 0 | 0 | 0 | 1 | 1 | 1 | 1 | 0 | 0 | 0 | 0 | 0 | 0 |
| d14 | 0 | 1 | 0 | 0 | 1 | 1 | | | | | | | | |
| d15 | 1 | 0 | 0 | 0 | 1 | 1 | | | | | | | | |
| d16 | 1 | 1 | 0 | 0 | 1 | 1 | | | | | | | | |
| d17 | 0 | 0 | 0 | 1 | 0 | 0 | 1 | 1 | 1 | 0 | 0 | 0 | 0 | 0 |
| d18 | 0 | 1 | 0 | 1 | 0 | 0 | | | | | | | | |
| d19 | 1 | 0 | 0 | 1 | 0 | 0 | | | | | | | | |
| d20 | 1 | 1 | 0 | 1 | 0 | 0 | | | | | | | | |
| d21 | 0 | 0 | 0 | 1 | 0 | 1 | 1 | 1 | 1 | 0 | 0 | 0 | 0 | 0 |
| d22 | 0 | 1 | 0 | 1 | 0 | 1 | | | | | | | | |
| d23 | 1 | 0 | 0 | 1 | 0 | 1 | | | | | | | | |
| d24 | 1 | 1 | 0 | 1 | 0 | 1 | | | | | | | | |
| d25 | 0 | 0 | 0 | 1 | 1 | 0 | 1 | 1 | 1 | 1 | 0 | 0 | 0 | 0 |
| d26 | 0 | 1 | 0 | 1 | 1 | 0 | | | | | | | | |
| d27 | 1 | 0 | 0 | 1 | 1 | 0 | | | | | | | | |
| d28 | 1 | 1 | 0 | 1 | 1 | 0 | | | | | | | | |
| d29 | 0 | 0 | 0 | 1 | 1 | 1 | 1 | 1 | 1 | 1 | 0 | 0 | 0 | 0 |
| d30 | 0 | 1 | 0 | 1 | 1 | 1 | | | | | | | | |
| d31 | 1 | 0 | 0 | 1 | 1 | 1 | | | | | | | | |
| d32 | 1 | 1 | 0 | 1 | 1 | 1 | | | | | | | | |

FIG. 6A

| TRIG POINT | ROM ADDRESS | | | | | | 8 BITS DATA OUT | | | | | | | |
|---|---|---|---|---|---|---|---|---|---|---|---|---|---|---|
| | A11 | A10 | A3 | A2 | A1 | A0 | D7 | D6 | D5 | D4 | D3 | D2 | D1 | D0 |
| d33 | 0 | 0 | 1 | 0 | 0 | 0 | 1 | 1 | 1 | 1 | 1 | 0 | 0 | 0 |
| d34 | 0 | 1 | 1 | 0 | 0 | 0 | | | | | | | | |
| d35 | 1 | 0 | 1 | 0 | 0 | 0 | | | | | | | | |
| d36 | 1 | 1 | 1 | 0 | 0 | 0 | | | | | | | | |
| d37 | 0 | 0 | 1 | 0 | 0 | 1 | 1 | 1 | 1 | 1 | 1 | 0 | 0 | 0 |
| d38 | 0 | 1 | 1 | 0 | 0 | 1 | | | | | | | | |
| d39 | 1 | 0 | 1 | 0 | 0 | 1 | | | | | | | | |
| d40 | 1 | 1 | 1 | 0 | 0 | 1 | | | | | | | | |
| d41 | 0 | 0 | 1 | 0 | 1 | 0 | 1 | 1 | 1 | 1 | 1 | 1 | 0 | 0 |
| d42 | 0 | 1 | 1 | 0 | 1 | 0 | | | | | | | | |
| d43 | 1 | 0 | 1 | 0 | 1 | 0 | | | | | | | | |
| d44 | 1 | 1 | 1 | 0 | 1 | 0 | | | | | | | | |
| d45 | 0 | 0 | 1 | 0 | 1 | 1 | 1 | 1 | 1 | 1 | 1 | 1 | 0 | 0 |
| d46 | 0 | 1 | 1 | 0 | 1 | 1 | | | | | | | | |
| d47 | 1 | 0 | 1 | 0 | 1 | 1 | | | | | | | | |
| d48 | 1 | 1 | 1 | 0 | 1 | 1 | | | | | | | | |
| d49 | 0 | 0 | 1 | 1 | 0 | 0 | 1 | 1 | 1 | 1 | 1 | 1 | 1 | 0 |
| d50 | 0 | 1 | 1 | 1 | 0 | 0 | | | | | | | | |
| d51 | 1 | 0 | 1 | 1 | 0 | 0 | | | | | | | | |
| d52 | 1 | 1 | 1 | 1 | 0 | 0 | | | | | | | | |
| d53 | 0 | 0 | 1 | 1 | 0 | 1 | 1 | 1 | 1 | 1 | 1 | 1 | 1 | 0 |
| d54 | 0 | 1 | 1 | 1 | 0 | 1 | | | | | | | | |
| d55 | 1 | 0 | 1 | 1 | 0 | 1 | | | | | | | | |
| d56 | 1 | 1 | 1 | 1 | 0 | 1 | | | | | | | | |
| d57 | 0 | 0 | 1 | 1 | 1 | 0 | 1 | 1 | 1 | 1 | 1 | 1 | 1 | 1 |
| d58 | 0 | 1 | 1 | 1 | 1 | 0 | | | | | | | | |
| d59 | 1 | 0 | 1 | 1 | 1 | 0 | | | | | | | | |
| d60 | 1 | 1 | 1 | 1 | 1 | 0 | | | | | | | | |
| d61 | 0 | 0 | 1 | 1 | 1 | 1 | 1 | 1 | 1 | 1 | 1 | 1 | 1 | 1 |
| d62 | 0 | 1 | 1 | 1 | 1 | 1 | | | | | | | | |
| d63 | 1 | 0 | 1 | 1 | 1 | 1 | | | | | | | | |
| d64 | 1 | 1 | 1 | 1 | 1 | 1 | | | | | | | | |

FIG. 6B

APPARATUS FOR TRIGGERING A PLURALITY OF THYRISTOR DEVICES

BACKGROUND OF THE INVENTION

1. Field Of The Invention

The invention relates to thyristor devices, more particularly to an apparatus for triggering thyristor devices into a conducting state.

2. Description Of The Related Art

Thyristor devices, such as silicon controlled rectifiers (SCR) and triacs, need trigger circuits to set them for operation in a conducting state. Present trigger circuits are usually set to permit triggering of thyristor devices at only one firing (or conduction) angle. Thus, if a plurality of thyristor devices are to be triggered at different firing angles, a plurality of trigger circuits would have to be used. This requires an abundance of circuit components, which occupies a lot of space. Because of the number of circuit components, there is difficulty in assembly and a relatively large expense is incurred.

SUMMARY OF THE INVENTION

Therefore, the objective of the present invention is to provide an apparatus for triggering a plurality of thyristor devices at different firing angles while eliminating the above mentioned disadvantages. Accordingly, the preferred embodiment of the apparatus for triggering a plurality of thyristor devices of the present invention comprises a full-wave rectifier circuit having a sinusoidal pulse output, a Schmitt trigger circuit to generate a constant amplitude pulse signal when the sinusoidal pulse output exceeds a certain triggering level, means for generating a predetermined number of clock pulses within the duration of the constant amplitude pulse signal, and an address counter to receive the generated clock pulses. The address counter has a digital output corresponding to the number of clock pulses received. A read-only memory means has digital data stored therein. The memory means has a plurality of address lines to receive the digital output of the address counter and a set of output data bits corresponding to the stored digital data which is accessed according to the digital output of the address counter. A digital switch has a plurality of input data lines to receive the output data bits of the memory means and a plurality of sets of output data lines. Each thyristor device has a gate electrode electrically connected to one of the output data lines. A decoder means is connected to the two most significant bits of the address lines of the memory means to selectively route the output data bits at the input data lines of the digital switch to one of the sets of output data lines according to the digital output received at the two most significant bits of the address lines. Each thyristor device is thus triggered into the conducting state by one of the output data bits of the memory means.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1A:
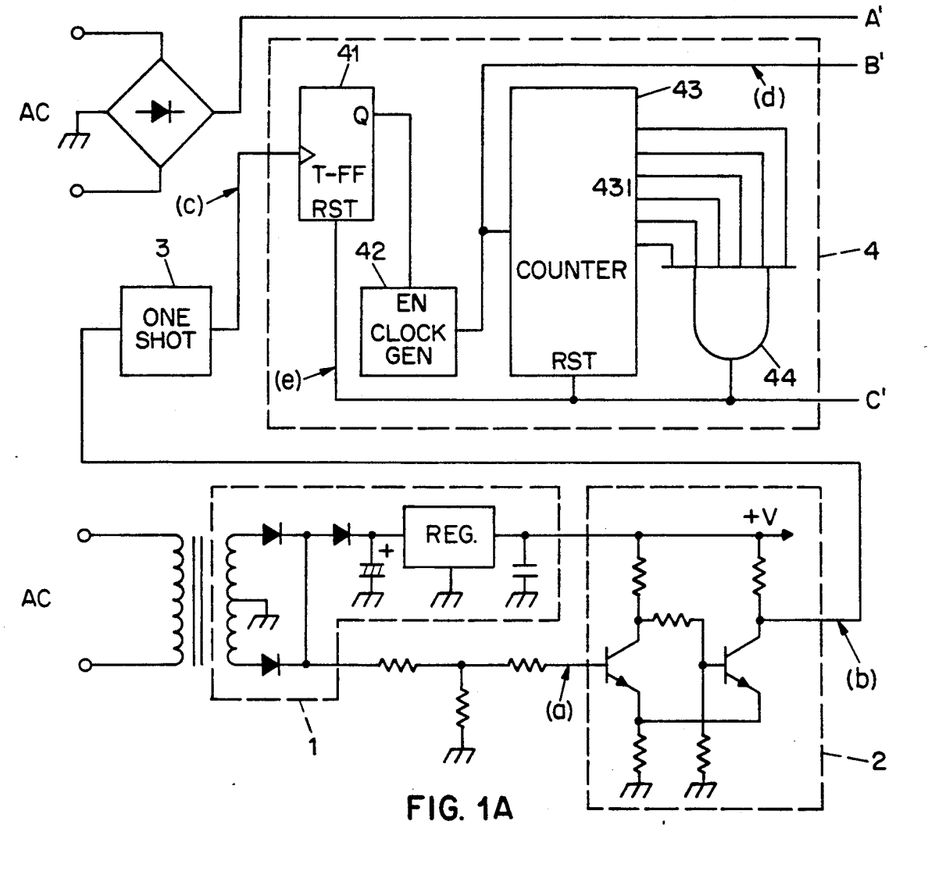
FIGS. 1A and 1B are schematic circuit diagrams of the preferred embodiment.
Figure 1B:
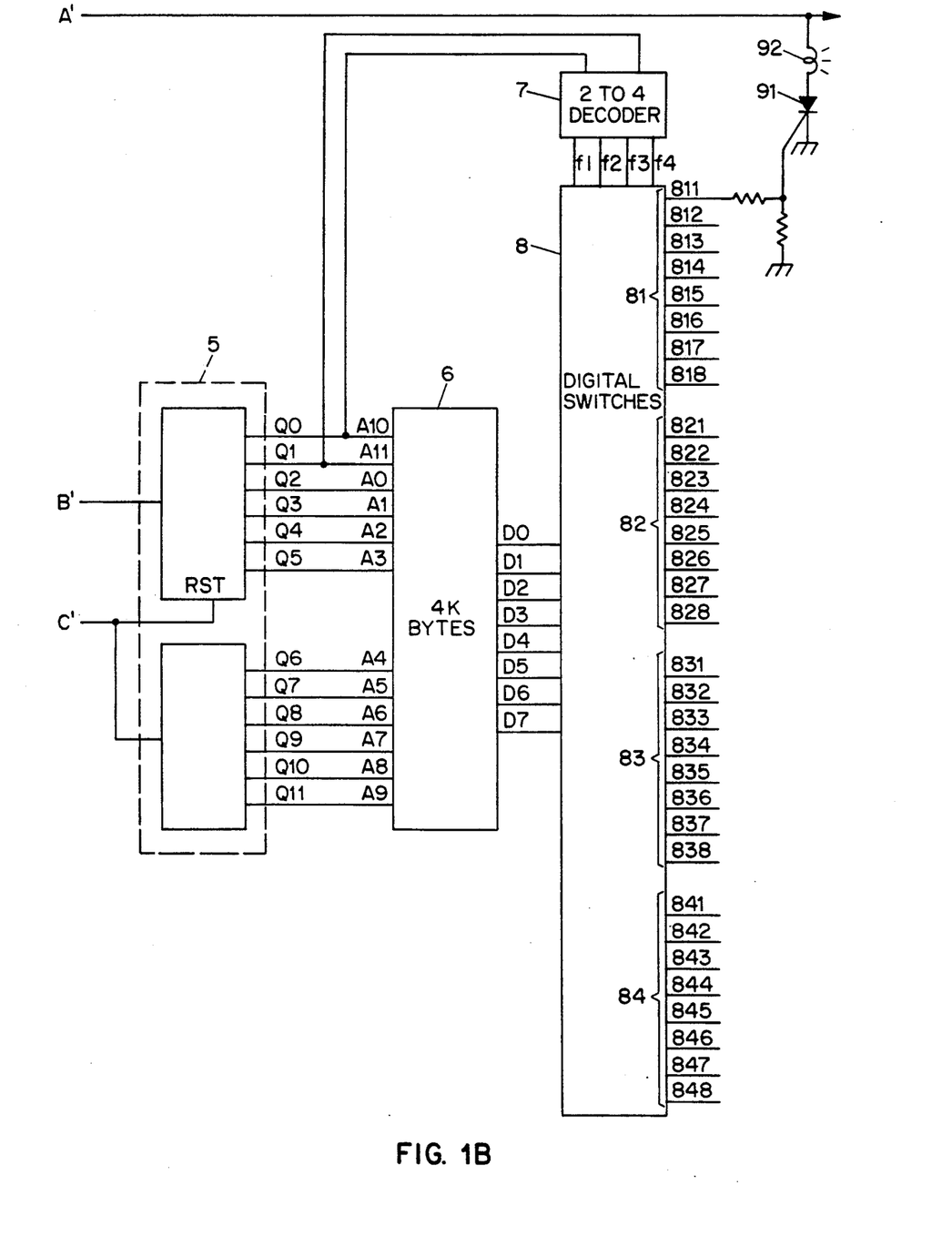

A schematic circuit diagram of the preferred embodiment, as illustrated in FIGS. 1A and 1B, shows the preferred embodiment to comprise a rectifier circuit means 1, a Schmitt trigger 2, a one-shot multivibrator 3, a pulse generator 4, an address counter 5, a memory unit 6, a decoder 7, and a digital switch 8.

Figure 2:
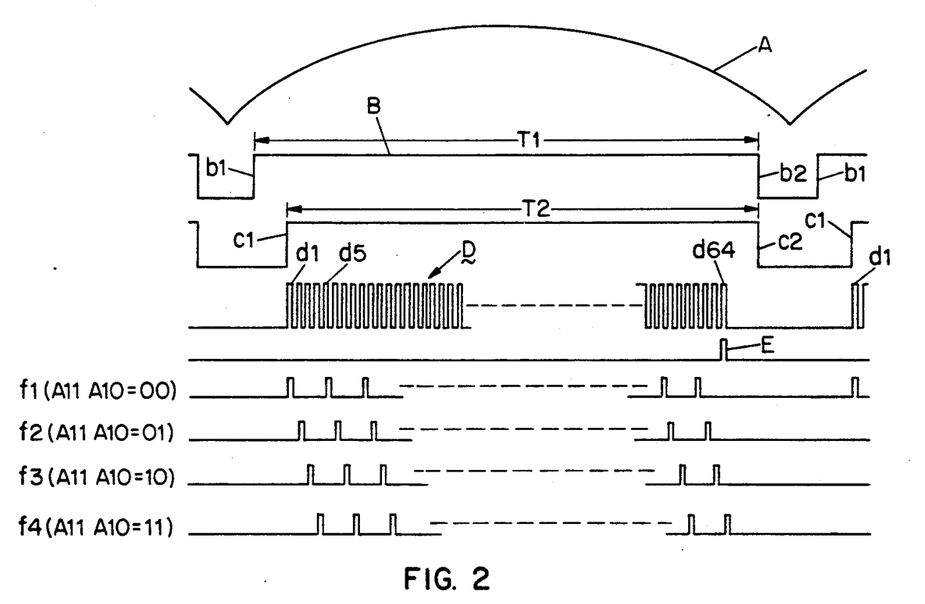
FIG. 2 is a timing diagram illustrating the signal outputs detected at different nodes of the preferred embodiment.

The rectifier circuit means 1 receives an AC supply input and provides two output signals: a regulated DC voltage supply +V and a full-wave rectified sinusoidal DC pulse signal. Referring to FIGS. 1A and 2, the voltage signal A at node (a) is the rectified sinusoidal pulse signal after it has passed through a resistor network.

The voltage signal A serves as input to the Schmitt trigger 2. The output signal B of the Schmitt trigger 2, as seen at node (b), is a pulse signal of constant amplitude. The pulse signal B exists only when the voltage signal A exceeds a certain DC voltage. The pulse signal B has a duration T1, a leading edge b1, and a falling edge b2.

The pulse signal B serves as input to the one-shot multivibrator 3. The output signal C of the one-shot multivibrator 3 is a delayed pulse signal having a duration T2 shorter than T1, a delayed leading edge c1 as compared to leading edge b1, and a falling edge c2 concurrent with the falling edge b2.

The pulse generator 4 comprises a toggle flip-flop 41, a clock generator 42, and a digital counter 43. The leading edge c1 of the pulse signal C triggers the flip-flop 41 and results in a high logic state at a Q output of the flip-flop 41. The high logic state at the Q output enables the clock generator 42, which responds by generating a pulse train output D. The digital counter 43 monitors the number of pulses produced by the clock generator 42. In the embodiment shown in FIGS. 1A and 1B, the six least significant output bits 431 of the digital counter 43 serve as inputs to an AND logic gate 44. When sixty-four pulses have been produced by the clock generator 42, each of the six least significant output bits 431 are at a high logic level. At this instant, the output signal E of the AND logic gate 44 changes to a high logic level. The output signal E acts as a resets signal for the digital counter 43 and the flip-flop 41. Once reset, the flip-flop 41 disables the clock generator 42. The clock generator 42 resumes its pulse train output when the flip-flop 41 is once more triggered by the leading edge c1 of the next pulse signal C. Referring once more to FIG. 2, the sixty-four pulses d1 to d64 are produced within the duration T2 of the pulse signal C.

Referring again to FIGS. 1A and 1B, the pulse train output D of the clock generator 42 serves as input to the address counter 5. The address counter 5 has twelve digital output bits, Q11 to Q0. Q11 is the most significant bit and Q0 is the least significant bit. Thus, the output range of the address counter 5 is from 000000000000 to 111111111111 in binary digits, or from 000 to FFF in hexadecimal digits.

The memory unit 6 comprises a ROM or an EPROM or a similar digital data storage device which can be programmed beforehand. The memory unit 6 has twelve address lines A11 to A0, with A11 being the most significant bit and A0 being the least significant bit. The memory unit 6 preferably contains 4K BYTES (1K=1024) of memory space. The address lines A11 and A10 of the memory unit 6 are connected to the address counter 5 at output bits Q0 and Q1, respectively. The remaining address lines A9 to A0 are connected to the output bits Q11 to Q2, in this order.

The total memory space of the memory unit 6 is divided into four 1K BYTES sectors. The first memory sector occupies the addresses 000 to 3FF (A11 A10=00). The second memory sector occupies the addresses 400 to 7FF (A11 A10=01). The third memory sector occupies the addresses 800 to BFF (A11 A10 =10). The fourth memory sector occupies the addresses C00 to FFF (A11 A10=11). When a particular address of the memory unit 6 is accessed, digital data stored in said memory address can be read at the output data lines D7 to D0.

Connection of the address lines A11 and A10 of the memory unit 6 to the address counter 5 at output bits Q0 and Q1 allows accessment of the four memory sectors in succession. Referring to FIG. 2, each pulse in each set of sixty-four pulses d1 to d64 of the pulse train output D permits accessing of only one of the four memory sectors. Thus, each memory sector is accessed sixteen times for each set of sixty-four pulses d1 to d64 of the pulse train output D.

The decoder 7 is a 2-to-4 line decoder having two input lines connected to the most significant address lines A11 and A10 of the memory unit 6, and four output lines f1 to f4. The pulse outputs at the output lines f1 to f4 for each set of sixty-four pulses d1 to d64 are shown in FIG. 2.

The digital switch 8 has four 8-bit output sets 81 to 84 and eight input data lines connected to the output data lines D7 to D0 of the memory unit 6. Each 8-bit output set 81 to 84 is selected according to the pulse output at the output lines f1 to f4. Once a particular output set 81 to 84 is selected, the logic state at lines D7 to D0 of the memory unit 6 is reflected at the selected output set. Each bit output of the four output sets 81 to 84 is connected to the gate electrode of one thyristor device 91 and supplies the triggering signal required to fire the thyristor device 91 into conduction. Each thyristor device 91 controls the passage of current from a power supply input through an electrical load 92. The supply input to the electrical load 92 is a full-wave rectified sinusoidal DC pulse signal which is in phase with, but has a greater amplitude than, the voltage signal A at node (a) of the schematic circuit diagram shown in FIG. 1A.

Figure 5A:
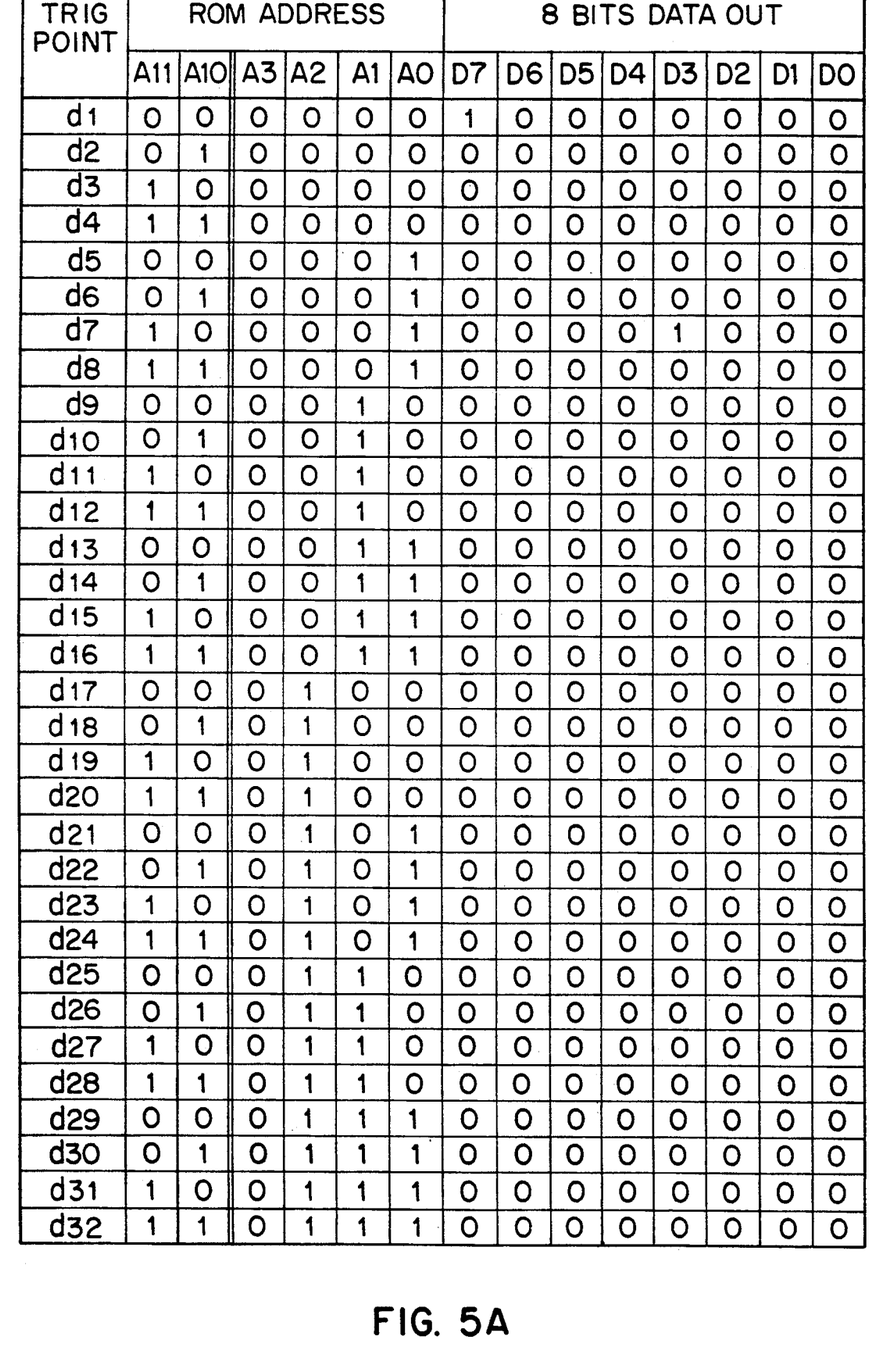
FIGS. 5A and 5B show the contents of the memory means of the preferred embodiment to illustrate a first example of the operation of the present invention.
Figure 5B:
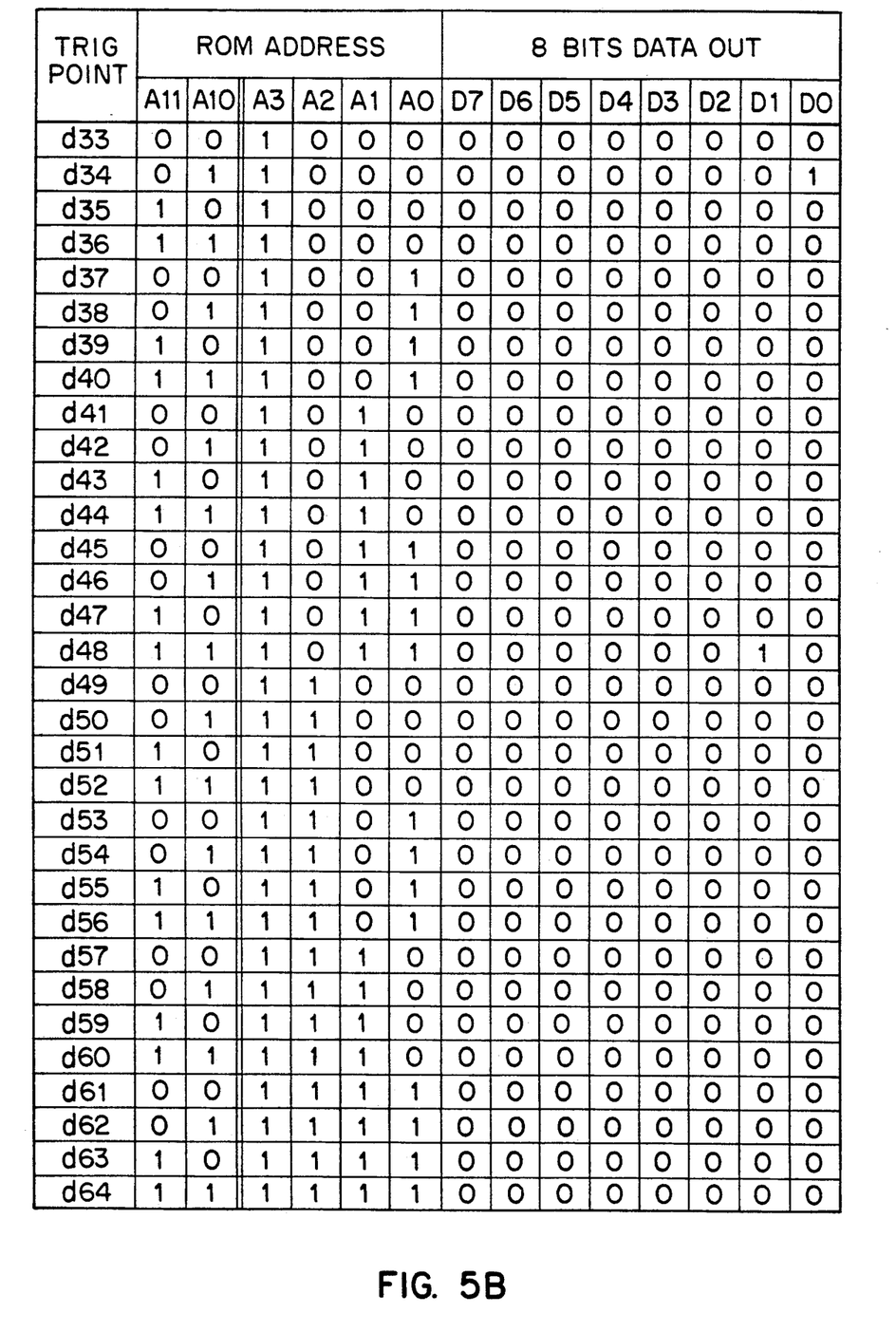

The following example illustrates the operation of the preferred embodiment:

The first sixty-four digital outputs (Q11 to Q0) of the address counter 5 is 000000000000 to 000000111111. Each input combination to the address lines A11 to A0 will access a particular memory space of the memory unit 6. The memory unit 6 will correspondingly reflect the content of the accessed memory space at the output data lines D7 to D10. Referring to FIGS. 5A and 5B, since Q11 to Q6 of the first sixty-four digital outputs of the address counter 5 are "0", the address lines A9 to A4 of the memory unit 6 are similarly "0". Thus, the address lines A9 to A4 are not shown in the column for the ROM addresses. In this example, the content of the memory unit 6 has been programmed such that four thyristor devices 91 will be triggered at d1, d7, d34, and d48 of the pulse train output D.

For the sake of simplicity, all references hereinafter to the ROM addresses will be in hexadecimal representations corresponding to the binary representations of the ROM addresses (A11 to A0) shown in FIGS. 5A, 5B, 6A, and 6B.

(1) When d1 is received by the address counter 5, the memory unit 6 is accessed at the first memory sector (ROM address 000). ROM address 000 has been programmed to contain 10000000 and thus, a logic "1" is detected at output data line D7. A logic "1" is similarly detected at f1 of the decoder 7 to indicate that the output set 81 of the digital switch 8 has been selected. Data from the output lines D7 to D0 of the memory unit 6 is reflected at output lines 811 to 818 of the output set 81. A logic "1" state at output line 818 triggers the first thyristor 91 into conduction, thus allowing current to pass through a first load 92.

(2) When d7 is received by the address counter 5, the memory unit 6 is accessed at the third memory sector (ROM address 801). ROM address 801 has been programmed to contain 00001000 and thus, a logic "1" is detected at output data line D3. A logic "1" is similarly detected at f3 of the decoder 7 to indicate that the output set 83 of the digital switch 8 has been selected. Data from the output lines D7 to D0 of the memory unit 6 is reflected at output lines 831 to 838 of the output set 83. A logic "1" state at output line 834 triggers the second thyristor 91 into conduction, thus allowing current to pass through a second load 92.

(3) When d34 is received by the address counter 5, the memory unit 6 is accessed at the second memory sector (ROM address 408). ROM address 408 has been programed to contain 00000001 and thus, a logic "1" is detected at output data line D0. A logic "1" is similarly detected at f2 of the decoder 7 to indicate that the output set 82 of the digital switch 8 has been selected. Data from the output lines D7 to D0 of the memory unit 6 is reflected at output lines 821 to 828 of the output set 82. A logic "1" state at output line 821 triggers the third thyristor 91 into conduction, thus allowing current to pass through a third load 92.

(1) When d48 is received by the address counter 5, the memory unit 6 is accessed at the fourth memory sector (ROM address C0B). ROM address C0B has been programmed to contain 00000010 and thus, a logic "1" is detected at output data line D1. A logic "1" is similarly detected at f4 of the decoder 7 to indicate that the output set 84 of the digital switch 8 has been selected. Data from the output lines D7 to D0 of the memory unit 6 is reflected at output lines 841 to 848 of the output set 84. A logic "1" state at output line 842 triggers the fourth thyristor 91 into conduction, thus allowing current to pass through a fourth load 92.

Figure 3:
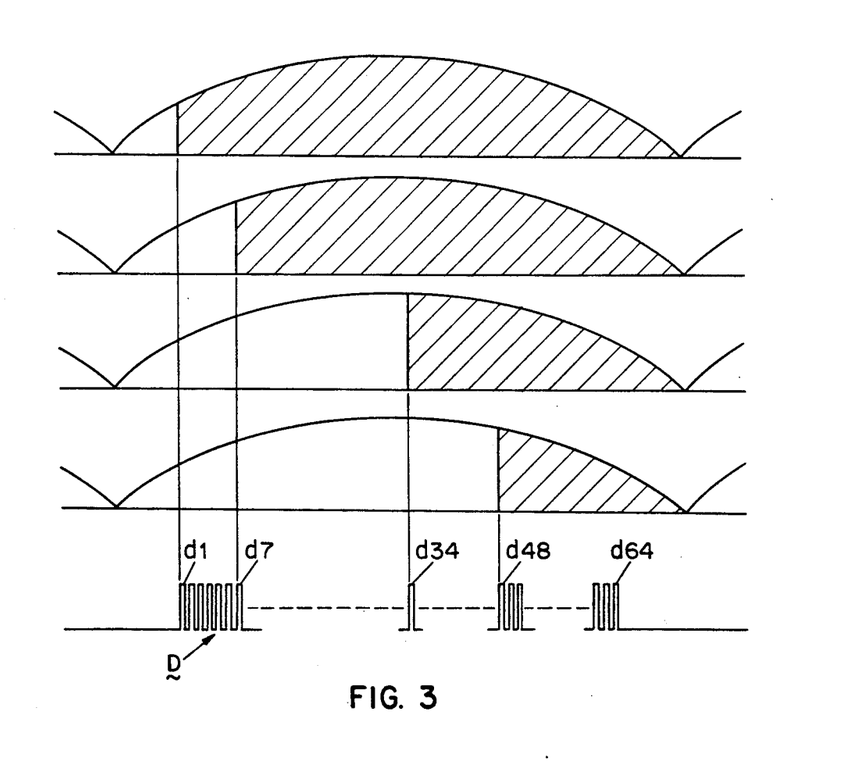
FIG. 3 is a timing diagram illustrating the triggering of four thyristor devices at different conduction angles according to the contents of the memory means as shown in FIGS. 5A and 5B.

FIG. 3 illustrates the triggering of the four thyristor devices 91 at different firing angles by the pulses d1, d7, d34 and d48. It is thus shown in the preceding example that for each set of sixty-four pulse inputs d1 to d64 to the address counter 5, each of the thyristor devices 91 connected to the digital switch 8 can be triggered into conduction at sixteen different firing angles for each sinusoidal pulse input to the electrical load 92. To set the firing angle of each of the thyristor devices 91, the memory unit 6 is programmed beforehand with the desired output data D7 to D0.

Examples of thyristor devices 91 which can be used in the preferred embodiment include silicon controlled rectifiers (SCR) and triacs. When an SCR is used as the thyristor device 91, it remains in the conducting state for the remaining duration of one sinusoidal DC pulse input ever when the trigger signal from the digital switch 8 has been removed. The SCR returns to the non-conducting state when the anode voltage reaches a minimum breakover value.

Figure 4:
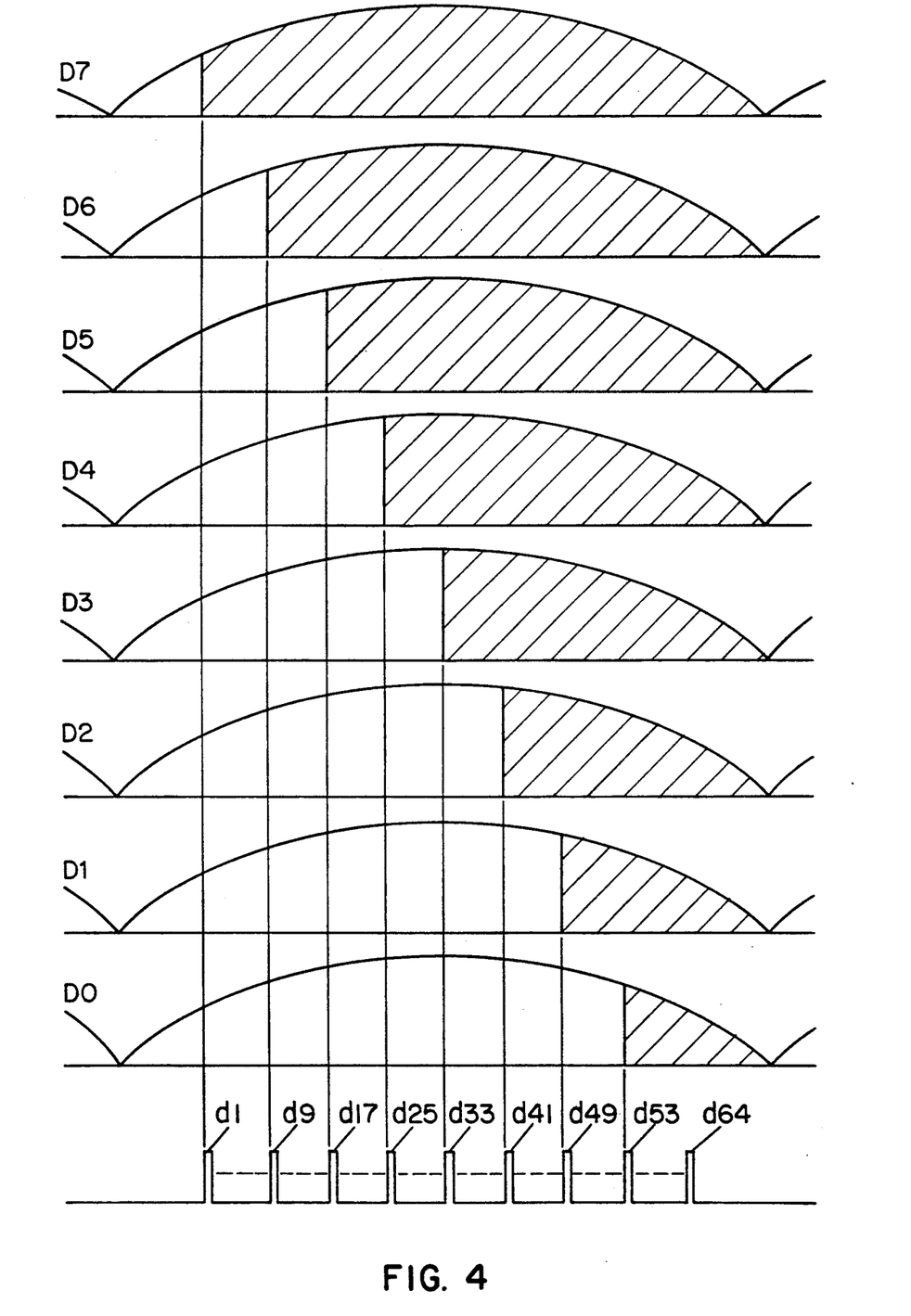
FIG. 4 is a timing diagram illustrating the successive triggering of eight thyristor devices according to the contents of the memory means as shown in FIGS. 6A and 6B.
Figure 6A:
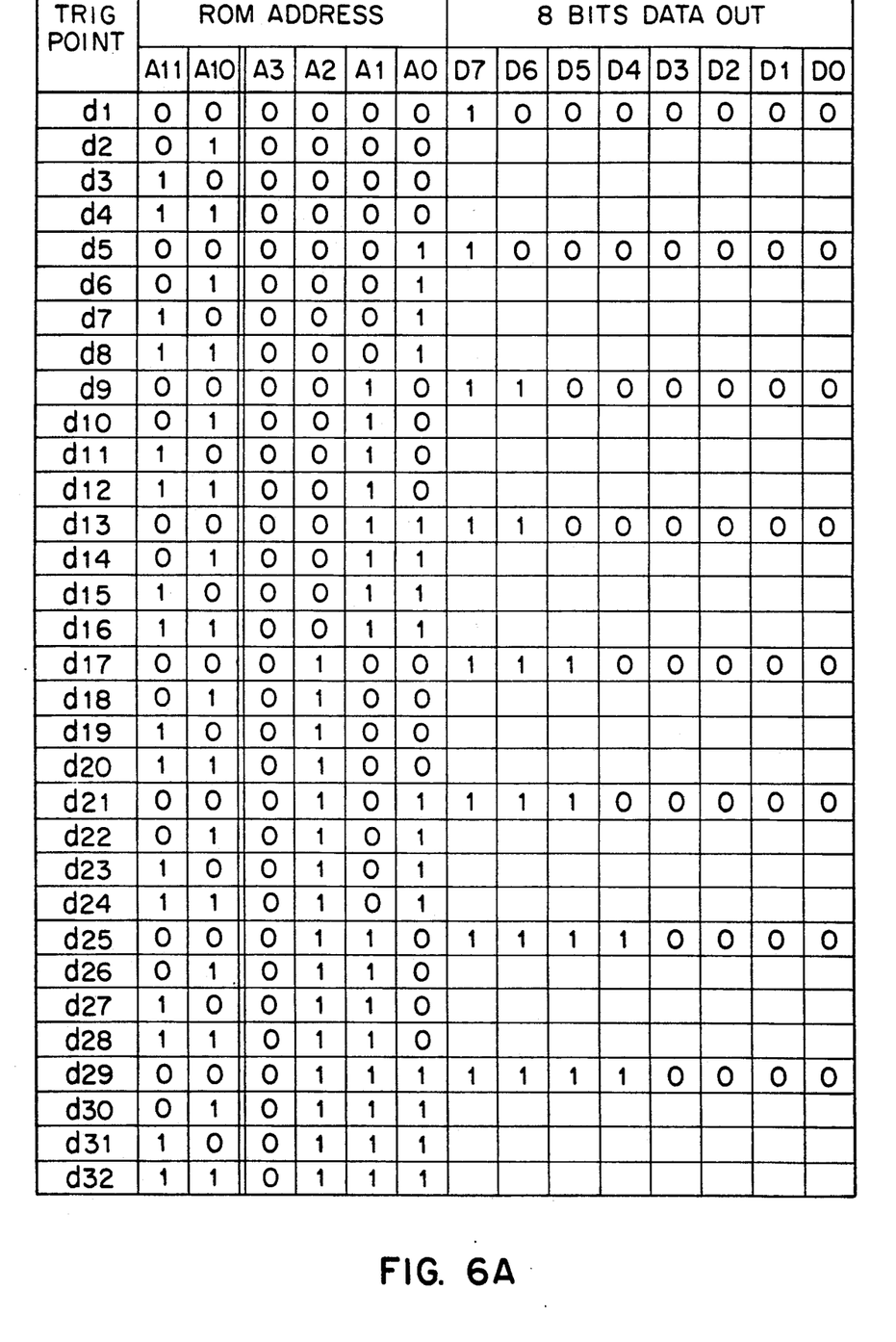
FIGS. 6A and 6B show the contents of the memory means of the preferred embodiment to illustrate a second example of the operation of the present invention.
Figure 6B:
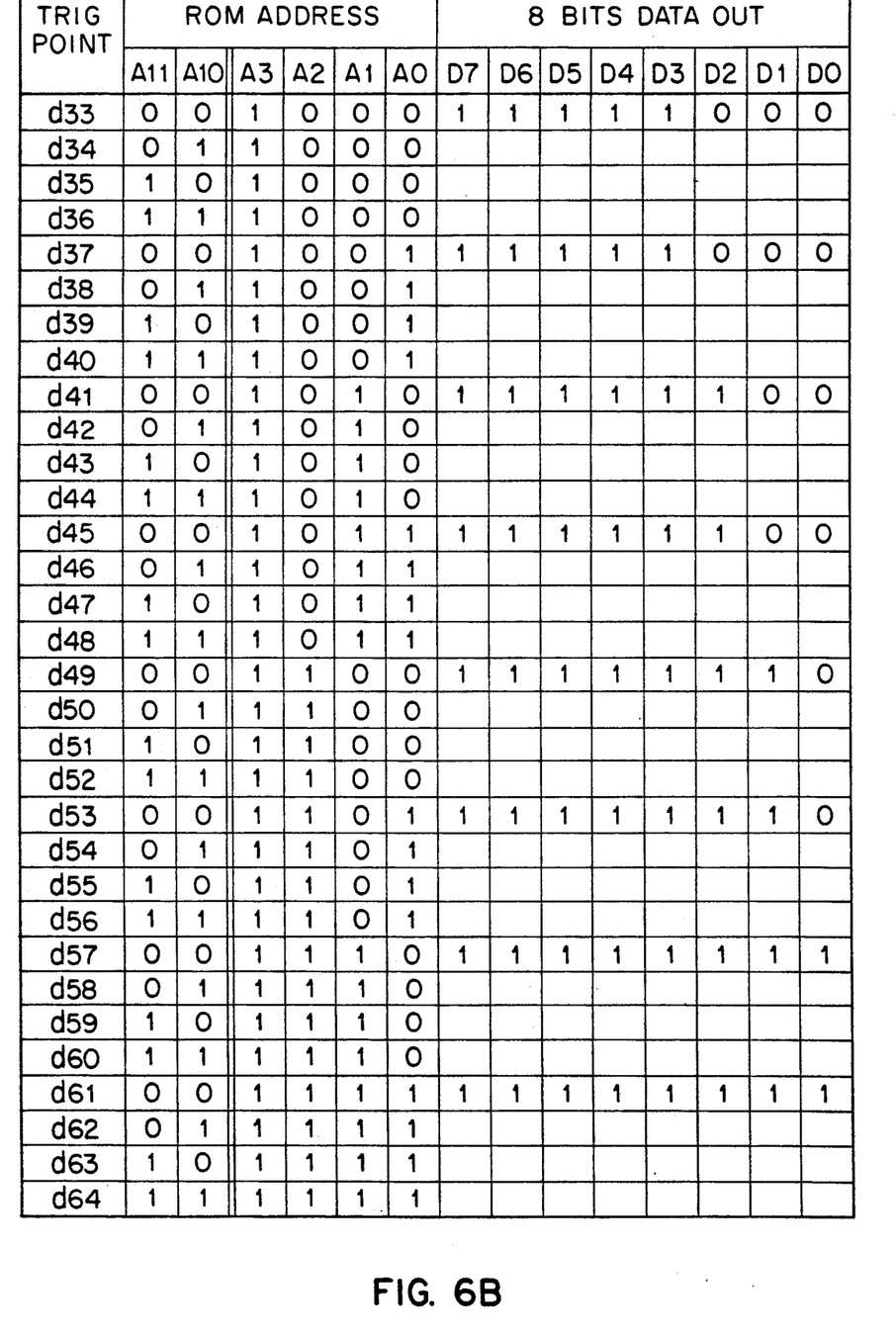

Referring to FIGS. 6A and 6B, the first memory sector of the memory unit 6 has been programmed such that eight thyristor devices 91 connected to the output lines 811 to 818 of the first output set 81 of the digital switch 8 will be triggered in succession. FIG. 4 illustrates the successive triggering of the eight thyristor devices 91 connected to the output lines 811 to 818 of the digital switch 8 at different firing angles. This triggering arrangement is not advisable for resistive loads (such as light bulbs) but is most favorable for inductive loads (such as motors). This is because inductive loads can improve the fluctuating current condition arising from this particular arrangement.

The output range of the address counter 5 is from 000000000000 (OOOH) to 111111111111 (FFFH). When the output FFFH is reached, the succeeding output of the address counter 5 is OOOH to signify the start of a new operating cycle. The address counter 5 and the memory unit 6 can be expanded from the present 12-bit output and 4K BYTES memory space, thus lengthening the operating cycle.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An apparatus for triggering a plurality of thyristor devices into conduction, comprising:
    a full-wave rectifier circuit means having a sinusoidal pulse output;
    a Schmitt trigger circuit means for generating a constant amplitude pulse signal when said sinusoidal pulse output exceeds a certain triggering level;
    means for generating a predetermined number of clock pulses within the duration of said constant amplitude pulse signal;
    an address counter to receive said clock pulses, said address counter having a digital output corresponding to the number of clock pulses received; and
    a read-only memory means to store digital data, said read-only memory means having a plurality of address lines to receive said digital output of said address counter, said read-only memory means having a set of output data bits corresponding to said stored digital data accessed according to said digital output of said address counter, each of said thyristor devices being triggered into the conducting state by one of said output data bits of said read-only memory means.

2. The apparatus as claimed in claim 1, further comprising a digital switching means having a plurality of input data lines to receive said output data bits of said read-only memory means, a plurality of sets of output data lines, each of said thyristor devices having a trigger electrode to be electrically connected to one of said output data lines, and a decoder means connected to a number of said address lines of said read-only memory means to selectively route said output data bits at said input data lines of said digital switching means to one of said sets of output data lines according to said digital output received at said number of said address lines.

3. The apparatus as claimed in claim 2, wherein said number of raid address lines are most significant bits of said address lines, said number of most significant bits of said address lines receiving an equal number of least significant bits of said digital output from said address counter.

* * * * *